(12) United States Patent
Lundby

(10) Patent No.: US 12,471,809 B2
(45) Date of Patent: Nov. 18, 2025

(54) DEVICE FOR DETERMINING THE HEMOGLOBIN COUNT OF A PATIENT

(71) Applicant: OpCO Medical Aps, Birkerod (DK)

(72) Inventor: Carsten Lundby, Birkerod (DK)

(73) Assignee: OpCO Medical Aps, Birkerod (DK)

( * ) Notice: Subject to any disclaimer, the term of this patent is extended or adjusted under 35 U.S.C. 154(b) by 1395 days.

(21) Appl. No.: 16/478,928

(22) PCT Filed: Jan. 30, 2017

(86) PCT No.: PCT/EP2017/051919
§ 371 (c)(1),
(2) Date: Jul. 18, 2019

(87) PCT Pub. No.: WO2018/137780
PCT Pub. Date: Aug. 2, 2018

(65) Prior Publication Data
US 2019/0380632 A1    Dec. 19, 2019

(51) Int. Cl.
*A61B 5/145*    (2006.01)
*A61B 5/08*    (2006.01)
(Continued)

(52) U.S. Cl.
CPC .......... *A61B 5/14542* (2013.01); *A61B 5/082* (2013.01); *A61B 5/0813* (2013.01);
(Continued)

(58) Field of Classification Search
CPC ..... A61B 5/14542; A61B 5/082; A61B 5/093; A61B 5/14546; A61B 5/14551;
(Continued)

(56) References Cited

U.S. PATENT DOCUMENTS 5,101,656 A * 4/1992 Miller ................ G01N 33/0036
73/31.04
5,979,443 A * 11/1999 Dingley .............. A61M 16/104
128/205.15
(Continued)

FOREIGN PATENT DOCUMENTS

CN        102809555 A    12/2012
DE    10 2006 057185 A1    6/2008
(Continued)

OTHER PUBLICATIONS

International Search Report and Written Opinion for corresponding Patent Application No. PCT/EP2017/051919 dated Sep. 28, 2017.
(Continued)

*Primary Examiner* — Jennifer Robertson
*Assistant Examiner* — Elina Sohyun Jang
(74) *Attorney, Agent, or Firm* — Renner, Otto, Boisselle & Sklar, LLP

(57) ABSTRACT

The present invention relates to a device for determination of the hemoglobin amount of a patient comprising: a closed gas volume (100); a gas outlet comprising a mouth piece (47), wherein the mouth piece (47) is configured to enable inhalation and exhalation of gas into and out of the closed gas volume (100); a means for carbon monoxide supply into the closed gas volume (100); characterized in that the means for carbon monoxide supply comprises a carbon monoxide reservoir (15) which is provided with sensors for the determination of temperature (19) and pressure (17) of the carbon monoxide in the carbon monoxide reservoir (15).

8 Claims, 1 Drawing Sheet

(51) Int. Cl.
*A61M 16/10* (2006.01)
*A61M 16/12* (2006.01)
*A61M 16/20* (2006.01)
*G01N 33/00* (2006.01)
*G01N 33/497* (2006.01)
*G01N 33/72* (2006.01)

(52) U.S. Cl.
CPC ....... *A61M 16/1005* (2014.02); *A61M 16/107* (2014.02); *A61M 16/12* (2013.01); *A61M 16/202* (2014.02); *G01N 33/004* (2013.01); *G01N 33/497* (2013.01); *G01N 33/721* (2013.01)

(58) Field of Classification Search
CPC ..... A61B 5/097; A61B 5/0813; A61B 5/0816; A61M 16/1005; A61M 16/0045; A61M 2016/102; A61M 2230/20; A61M 16/0003; A61M 16/0051; A61M 16/208; A61M 16/107; A61M 16/12; A61M 16/202; G01N 33/004; G01N 33/721; G01N 33/497
See application file for complete search history.

(56) References Cited

U.S. PATENT DOCUMENTS

| | | | | |
|---|---|---|---|---|
| 5,991,040 | A * | 11/1999 | Doemens | G01B 11/026 356/614 |
| 10,655,786 | B1 * | 5/2020 | Dean | F16K 3/085 |
| 2003/0219497 | A1 * | 11/2003 | Otterbein | A61K 33/00 424/699 |
| 2005/0075552 | A1 | 4/2005 | Schmidt et al. | |
| 2007/0004858 | A1 * | 1/2007 | Zech | C08L 83/04 524/860 |
| 2009/0071481 | A1 | 3/2009 | Fishman | |
| 2012/0215504 | A1 * | 8/2012 | Parker | A61B 5/14542 703/2 |
| 2012/0242501 | A1 | 9/2012 | Tran et al. | |
| 2014/0088378 | A1 * | 3/2014 | Muzet | A61B 5/7282 600/301 |
| 2015/0140670 | A1 | 5/2015 | Lam et al. | |
| 2016/0015324 | A1 * | 1/2016 | Du Bois | A61B 5/097 600/538 |
| 2016/0069847 | A1 | 3/2016 | Stripp | |
| 2017/0119280 | A1 * | 5/2017 | Ahmad | A61B 5/097 |

FOREIGN PATENT DOCUMENTS

| | | |
|---|---|---|
| JP | 5670530 B1 | 2/2015 |
| JP | 2015058388 | 3/2015 |
| WO | 03/100440 A1 | 12/2003 |

OTHER PUBLICATIONS

International Preliminary Examination Report for corresponding Patent Application No. PCT/EP2017/051919 dated May 3, 2019.
Original and English Translation of the First Chinese Office Action issued on Aug. 25, 2021, for corresponding Chinese Application No. 201780085020.5.
Original and English Translation of the Decision to Grant issued on Jun. 6, 2022 for corresponding Chinese Application No. 201780085020.5.
Japanese Office Action for corresponding Patent Application No. JP 2019-562460 dated Nov. 17, 2020.

* cited by examiner

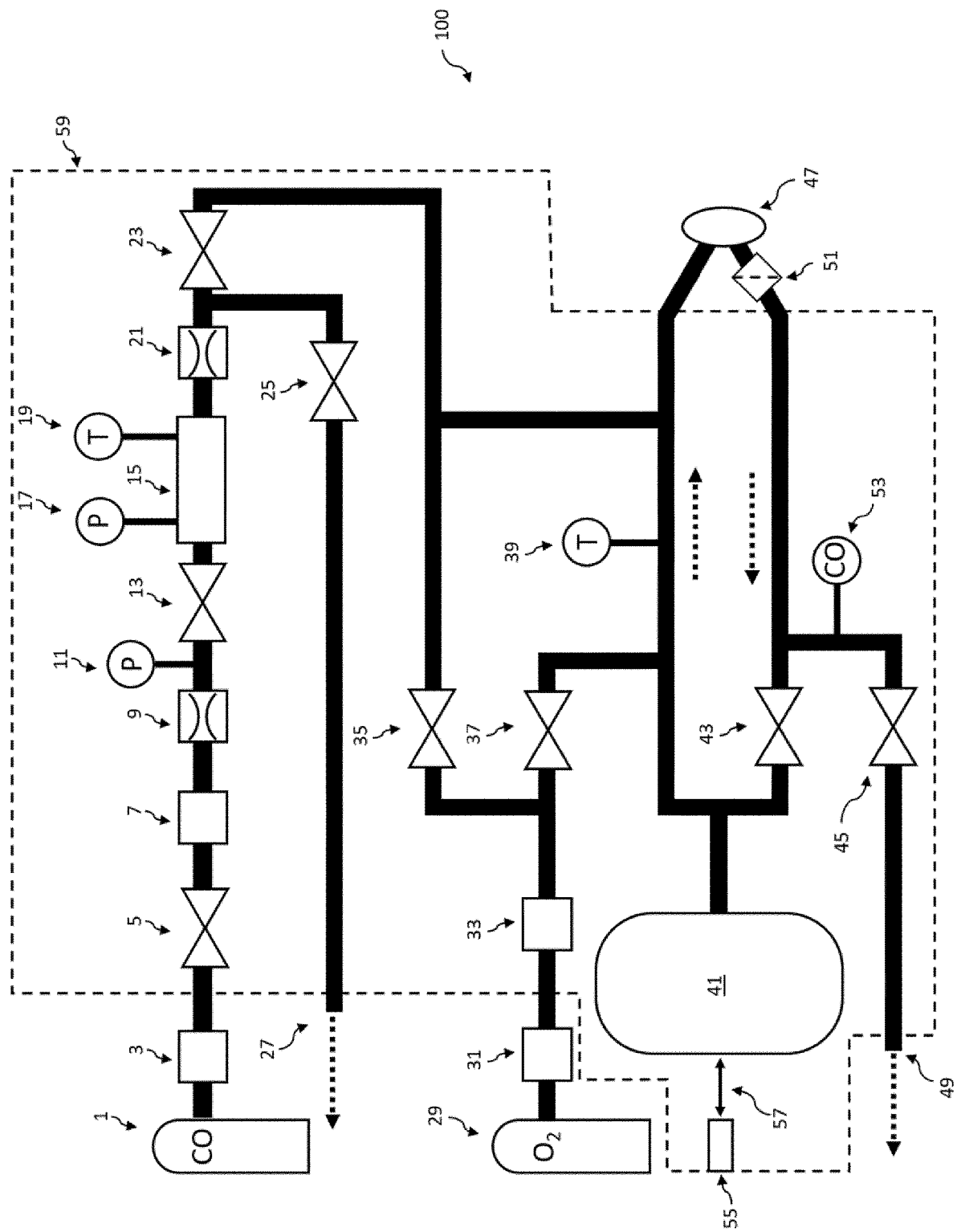

DEVICE FOR DETERMINING THE HEMOGLOBIN COUNT OF A PATIENT

1. FIELD OF THE INVENTION

The present invention relates to a device for the determination of the hemoglobin amount of a patient.

2. BACKGROUND OF THE INVENTION

Hemoglobin is the iron-containing protein complex of the red blood cells which can bind oxygen and transport it in the blood circulation. According to the central role in the oxygen supply, many diseases such as anemia, polyglobulia and dehydration or hyperhydration are associated with a change of the hemoglobin amount in the blood. For the diagnosis and treatment of diseases the hemoglobin amount in the blood of the patient can be determined. This can be performed by various invasive or noninvasive methods.

Patent Document WO 03/100440 A1 discloses a device and a method for the determination of the hemoglobin amount via inhalation of a predetermined amount of carbon monoxide. Herein, the device comprises a mouth piece, which is connected via a connector with a bag, which can be filled with oxygen.

Patent Document US 2015/0140670 A1 discloses a method and a diagnose kit, which is configured to determine quickly and noninvasively physiological hemoglobin levels. A diagnose kit can include a chamber, which is prefilled with an indicator, wherein the indicator solution contains a tetramethylbenzidine (TMB) solution, wherein the solution is configured to change the color. Further a reception means can be provided to receive a sample of a test subject.

According to the prior art, the hemoglobin value in the blood of the patient can be determined more or less accurate. However, it is desirable to determine the hemoglobin value as accurate as possible to improve diagnostics of diseases and treatment of the symptoms associated with the disease.

Accordingly, it is object of the present invention to provide an improved device and method to determine the hemoglobin amount of a patient, which at least partly solves the above noted problems.

3. DETAILED DESCRIPTION OF THE INVENTION

The above noted problems are solved by a device described herein and a method described herein.

The present invention relates to a device for determination of the hemoglobin amount of a patient, comprising: a closed gas volume, a gas outlet comprising a mouth piece, wherein the mouth piece is configured to enable inhalation and exhalation of gas into and out of the closed gas volume, a means for carbon monoxide supply into the closed gas volume; characterized in that the means for carbon monoxide supply comprises a carbon monoxide reservoir which is provided with sensors for the determination of temperature and pressure of the carbon monoxide in the carbon monoxide reservoir. Hemoglobin comprises a high binding affinity for carbon monoxide (CO). The binding affinity of the hemoglobin is approximately 200 to 300 times larger for carbon monoxide compared to oxygen. Hence, inhaled carbon monoxide replaces the oxygen that is bound to the hemoglobin in the blood of a patient. By a measurement of the carbon monoxide, which is bound to the hemoglobin, it can be inferred to the content or the amount of hemoglobin in the blood of a patient. For this, an exact determination of the amount of the supplied carbon monoxide is necessary. The carbon monoxide is dependent on the hemoglobin amount in the blood of the patient and the applied amount of carbon monoxide. For the determination of the hemoglobin amount it is crucial to know how much carbon monoxide was provided for inhaling, since a higher or lower amount of provided and administered carbon monoxide can lead to a correspondingly higher or lower amount of carbon monoxide bound in the blood of a patient. Accordingly, the inaccuracy of the determination of the hemoglobin amount increases with the inaccuracy of the determination of the amount of the administered carbon monoxide.

So far, the administered carbon monoxide was manually drawn into volumes of syringes and was visually controlled. Herein, an exact determination of the so-drawn carbon monoxide volume and accordingly the carbon monoxide amount, which is contained in the volume, is only roughly possible. To reduce the error during the drawing of the carbon monoxide volume, the employed syringes were "flushed" by a repeated drawing of the carbon monoxide gas, such that no residual gas, for example environmental air, is present in the volume of the syringe. However, this operation takes time and toxic carbon monoxide is released into the environmental air. Thus, it must be worked under a fume hood, which is not necessary with a measurement of the device according to the invention, since the administered carbon monoxide cannot leave the gas volume in an uncontrolled manner. Additionally, in the common method, carbon monoxide is undesirably wasted that cannot be used for the measurement. To the contrary, in the to present invention, the amount of carbon monoxide that is contained in the carbon monoxide reservoir and supplied to the closed gas volume is exactly determined. Opposite to the common approach, a carbon monoxide amount can be exactly determined by the measurement of the pressure and the temperature. Herein the carbon monoxide reservoir can consist of a metal, preferably of aluminum, which allows for an exact determination of the volume that is provided by the reservoir. However, also other suitable materials can be employed for the carbon monoxide reservoir, such as plastics, such as polyoxymethylene. By the exact determination of the amount of the supplied carbon monoxide, the accuracy of the determination of the hemoglobin is accordingly improved. The necessity for "rinsing" of the carbon monoxide reservoir is eliminated, since it a closed gas system is provided and, hence, no other gas but the supplied carbon monoxide should be present in the reservoir. Additionally, the increase of pressure in the reservoir is directly connected with the supplied amount of carbon monoxide and a residual amount of carbon monoxide in the reservoir can be exactly determined accordingly. By measuring the temperature of the carbon monoxide, the device further ensures, according to the invention, that the administered amount of carbon monoxide can be exactly determined independent from the environmental temperature, which can have an impact on the gas temperature and hence on the volume of the gas. This reduces the error susceptibility of the measurement of the device according to the invention. Due to the closed gas volume and the carbon monoxide reservoir, which is separated from the environment, it is prevented that toxic carbon monoxide is released to the environment before or during the carbon monoxide intake of the patient. Thus, the device is suitable to be operated without particular additional precautionary measures and can, for example, be employed in a private practice or in common treatment rooms in a clinic. Hence, an exact hemoglobin determination is enabled by the exact determination of the administered amount of carbon monoxide. Furthermore, the hemoglobin determination can be performed easily and precisely, also during different points in time, in order to, allow for instance a measurement of hemoglobin amounts in the blood of patients during the course of a disease, also over a longer period of time, in a comparable manner. Furthermore, the parts can be formed sterilizable and reusable, which saves material costs and avoids waste. Subsequent to the mouth piece, an anti-bacterial and/or anti-viral filter can be arranged, which filters the exhaled air of the patient before it enters the closed gas volume. Thus, a viral or bacterial contamination of the closed gas volume is prevented.

The gas volume can further comprise a humidity filter, wherein the humidity filter is configured to filter out the humidity of the closed gas volume, which is advantageous, since the humid and warm air that is exhaled can otherwise lead to a droplet formation, for instance at the inner walls of the gas volume. Thus, damaging of the parts of the device by the moisture or a settlement of germs or molds that prefer a humid environment can be prevented. For instance, the humidity filter can be arranged in the proximity to the mouth piece such that the contained humidity can be extracted from the exhaled air immediately before it reaches the closed gas volume. Furthermore, an electrically driven blower can be connected to the closed gas volume. Accordingly, the gas volume can be dried before or after a measurement within a few minutes by blowing air into the gas volume and guiding it out of the gas volume via a gas outlet.

In a preferred embodiment, the means for carbon monoxide supply is configured to supply a defined amount of carbon monoxide into the closed gas volume. Supplying the defined amount of carbon monoxide into the gas volume can be performed by an automatic provision of carbon monoxide, without additional intervention of the user, which increases accuracy and reproducibility of the measurement. The supply can also be manually triggered by a user, which leads to a flexible measurement, such that the time point of supplying the carbon monoxide gas to the gas volume can be freely chosen for different general conditions, for instance for different patients or concerning further measurement parameters.

In a preferred embodiment, a carbon dioxide filter is arranged in the closed gas volume, which is configured to filter out carbon dioxide from the closed gas volume. Since the gas volume is closed, the gas volume is enriched with carbon dioxide ($CO_2$) during in- and exhalation of a patient. However, a carbon dioxide concentration that is too high can be harmful and thus a carbon dioxide filter is preferably arranged in the gas volume to allow filtering out the surplus carbon dioxide during the measurement operation from the gas volume. The filter can be provided in an exchangeable manner such that it can be easily exchanged when the storage capacity of the filter for $CO_2$ is reached. Filtering out the $CO_2$ also allows that the gas volume can be in- or exhaled by a patient for a longer period of time without disadvantageously increasing the $CO_2$ concentration in the gas volume.

In a preferred embodiment, the device comprises a means for oxygen supply, wherein the means is configured to supply oxygen to the closed gas volume. Because of the oxygen supply, a patient can in- and exhale the gas in the gas volume for a longer period of time without the oxygen content becoming disadvantageously low after a certain time. The means can supply pure oxygen or a mixed gas with a lower oxygen concentration to the gas volume. Preferably the oxygen concentration can be kept constant in the closed gas volume. For this purpose, the means for oxygen supply can also comprise a sensor which can determine the oxygen concentration in the gas volume. The oxygen supply can be performed in a constant or intermittent manner such that the oxygen concentration does not fall below a defined threshold value. The means for oxygen supply can also comprise one or more pressure reducer which allows that an oxygen reservoir comprising a high pressure such as an oxygen gas bottle can be connected to the device. The means for oxygen supply can be connected via one or more lines which can be formed arbitrarily flexible or rigid, to the gas volume, wherein for instance different lines can be used in order to supply oxygen during the operation of the device to the gas volume, for instance during "rinsing" of the closed gas volume with oxygen or during the administration of carbon monoxide. Further, the means for oxygen supply can be configured to mix the oxygen with the supplied carbon monoxide in order to subsequently supply the gas mixture to the gas volume. The joint supply provides the advantage that different gases can be supplied to the gas volume at the same time, which can reduce the operating time during a measurement.

In a preferred embodiment, the means for oxygen supply comprises an elastic balloon, wherein the elastic balloon comprises during operation a maximum filling volume of 6 liters, preferably 4.5 liters and particularly preferred 3 liters. The elastic balloon can comprise a high elasticity which allows for a flexible adjustment to different fitting volumes. This may, for instance, become necessary, if different patients with different lung volumes are to be measured with the device. Accordingly, the balloon can be suitable for small filling volumes, as required for children, as well as for larger filling volumes, e.g. for adults. Furthermore, the balloon can be provided in an exchangeable manner such that balloons with different volumes can be provided in the device. The balloon is preferably configured such that an easy in- or exhaling of a patient is facilitated. Accordingly, the restoring forces that force the gas out of the inflated balloon after exhalation of the patient back into the lung, must not be disadvantageously large. Also, the balloon can be provided in an exchangeable manner such that different balloons can be used, as desired. The balloon is preferably deflated during the inhalation of the patient as much as possible to avoid a residue of carbon monoxide remaining in the balloon. The balloon can be provided at the device such that its envelope has no contact with a restricting surface, for instance the ground, during operation. This provides for the advantage that the extension of the balloon is not restricted. Furthermore, the extension and contraction of the balloon can be actively controlled during operation. Accordingly, in- and exhaling of a patient can be actively supported which can be particularly of advantage for patients that have problems of breathing independently. Further, a defined breathing is allowed by the active control of the balloon, for instance, via a defined breathing frequency or breathing volume, such that, for instance, the gas of the gas volume, which is in- or exhaled for a particular period of time, can be exactly determined which increases the reproducibility of the measurements. Furthermore, the balloon can be used to determine the lung volume of the patient by determining the exhaled volume, which correspondingly increases the volume of the balloon.

In a preferred embodiment, the device comprises a means for determination of the filling volume of the elastic balloon, wherein the means is preferably an optical means, which is configured to detect the distance between the optical means and the envelope of the elastic balloon. The means for determining the filling volume can be used to allow for a detection of the gas volume during operation. The balloon can have a defined expansion, dependent on the filling volume. Further, the distance between the envelope of the balloon and the means for determination of the filling volume can be performed by an optical distance measurement, such as a runtime measurement of a reflected light pulse. For this, the distance between the envelope of the balloon and the means for determination of the filling volume can be calibrated to defined filling volumes such that a particular distance corresponds to a defined filling volume, respectively. The control for the means for determination of the filling volume can be, for instance, also connected to the control for the means of oxygen supply and/or the control for the means of carbon monoxide supply to control the process of in- or exhalation exactly. For an actively driven balloon, it can also be connected to the means for determination of the filling volume of the balloon, in order to control the filling volume during the breathing.

In a preferred embodiment, the optical means comprises at least a laser and a detector, wherein the laser and the detector are fixedly arranged at the device. The envelope of the balloon is suitable to a reflect light pulse which is emitted by the laser back to the detector. Laser and detector can have a defined distance to the balloon because of the fixed arrangement relative to the device. Accordingly, the balloon can be fixedly arranged at the device, for instance, by having a mounting, which allows for an extension or contraction of the balloon but keeps the relative position of the balloon to the device constant. Thus, an erroneous determination of the filling volume of the balloon is prevented when using a likewise fixedly mounted laser and detector because the relative positions of balloon, laser and detector are constant to each other.

In a preferred embodiment, the device comprises a carbon monoxide detector, which is configured to detect the carbon monoxide content of the closed gas volume. The carbon monoxide detector can measure the carbon monoxide content which, for instance after supply of carbon monoxide and in- and exhalation of the gas by the patient, remains in the gas volume. Thus, it can be ensured that the supplied carbon monoxide was uptaken by the patient. Further, the defined amount of the carbon monoxide, which was taken up by the patient, can be corrected by the residual amount of carbon monoxide in the gas volume, which reduces the error for the determination of the hemoglobin value.

In a preferred embodiment, the device comprises a further gas outlet, wherein the carbon monoxide detector is arranged at said further gas outlet. The further gas outlet can allow for an exhalation of the patient into the environment. This can, for instance, be of advantage at the end of a detection, when the residual amount of carbon monoxide, which was not uptaken by the patient, is to be measured. Herein, the elastic balloon can be completely deflated such that all of the residual gas can discharge from the gas volume into the environment. Thus, an exact detection of the carbon monoxide contained in the gas volume is possible at said further gas outlet.

In a preferred embodiment, the means for carbon monoxide supply and/or the means for oxygen supply and/or the gas outlets are connected to the closed volume via valves, wherein the valves are separately adjustable. A separate control of the valves allows for controlling a respective supply or a discharge of gas into or out of the gas volume, respectively. Accordingly, dependent on the type of operation, for instance during the supply of oxygen or carbon monoxide or during the deflation of the gas volume, different valves can be opened or closed differently long or at different times during the operation of the device. This allows for a flexible adjustment during operation, e.g. for measurements with different measuring parameters.

In a preferred embodiment, the at least one pressure sensor of the carbon monoxide reservoir comprises a measurement inaccuracy of <100 mbar, preferably <50 mbar and particularly preferred <20 mbar. In a preferred embodiment, the at least one temperature sensor of the carbon monoxide reservoir comprises a measurement inaccuracy of <2° C., preferably <1.2° C. and particularly preferred <0.6° C. Herein, the pressure and the temperature can be electronically measured, wherein the determination of the carbon monoxide amount can be performed independently of the user, which reduces the error of the determination of the hemoglobin amount in a patient even further.

In a preferred embodiment, the device comprises a control device, wherein the control device determines the volume of the carbon monoxide in the carbon monoxide reservoir with a measurement inaccuracy of <10 ml, preferably <5 ml and particularly preferred <2.4 ml. The determination of the volume of the carbon monoxide and/or the temperature and/or the pressure can be performed via a corresponding display which can be arranged in a manner readable from the outside of the device. The device can also comprise a respective interface for the transmission of the determined values to a computer, for example.

In a preferred embodiment, the mouthpiece is exchangeable. Accordingly, the device can be configured quickly and hygienically for different patients. For instance, sterile disposable mouth pieces can be used that can comprise, for instance, anti-bacterial or anti-viral filters.

In a preferred embodiment, the means for carbon monoxide supply and/or the means for oxygen supply comprise at least one adjustable part for supplying or discharging carbon monoxide or oxygen. The supply of carbon monoxide or oxygen can be performed via gas storage media with larger volumes or pressures, such as gas bottles. Thus, the device can be operated for a long time without the need to exchange the connected gas storage media. The controllable ports of the gas storage media can comprise a pressure reducer that allows for a safe filling of the means for carbon monoxide supply and/or oxygen supply. Further, the controllable ports can serve for closing the gas storage means which can prevent an undesired gas leakage and accordingly increases the safety during operation or storage.

In a preferred embodiment, all parts of the device, except the mouth piece and the carbon dioxide filter are arranged in a housing. The advantageous arrangement in a housing allows for a protection of the single parts of the device from undesired outer impacts, such as dust and debris. Advantageously, the housing can be formed of a stiff and at the same time light weighted material, such as aluminum, to protect the housed parts from damages, e.g. by knocks or impacts. Further, the housing can be formed such that the device is suitable for a sterile operation. Accordingly, it can be advantageously sealed and coated at its outer surface, if necessary. Furthermore, the device can comprise security mechanisms which can prevent an undesired leakage of carbon monoxide. Hence, the valves can be controlled in a way that they close when a measured threshold value of a measurement device for carbon monoxide, which is arranged in the housing, is exceeded, or when the pressure in the carbon monoxide reservoir during the filling raises too slow, which can indicate for a leakage, or when the pressure in the carbon monoxide reservoir exceeds a threshold value.

The present invention further relates to a method for the determination of a hemoglobin amount using a device according to one of the preceding embodiments, wherein the method comprises the steps: i) supplying at defined amount of carbon monoxide to the closed gas volume; ii) in- and exhaling the gas in the closed gas volume by the patient; iii) determination of the amount of carbon monoxide in the blood of the patient; iv) determination of the hemoglobin value based on the amount of carbon monoxide in the blood of the patient. Herein, the hemoglobin value can be determined by taking at least one blood sample before the administration of the carbon monoxide and at least one blood sample after the administration of the carbon monoxide. The exact point of time for taking the blood can be varied. The hemoglobin value can be determined by the difference of the carbon monoxide content of a respective blood sample. Furthermore, the carbon monoxide content in the blood can also be determined non-invasively, for instance via optical means.

In a preferred embodiment, the hemoglobin amount of the patient is determined with an inaccuracy of <2.5%, preferably <1.5%, and particularly preferred <1%. Such an accuracy can be advantageous in the diagnosis of diseases. Further, such an accuracy can be advantageous for the design of a therapy, which is for instance dependent on the hemoglobin value of the patient and can accordingly be tailored to the patient needs. Such an accuracy accordingly allows also for long terms measurements, for instance, for the observation of a patient over several years to describe courses of diseases more precisely and to determine, inter alia, whether a therapy works well or fails and to adjust it, if necessary.

In a preferred embodiment, the method comprises before step i) the steps: supplying pure oxygen into the closed gas volume; and in- and exhaling of the supplied pure oxygen by the patient. This so called "rinsing" with pure oxygen provides the advantage that the hemoglobin binds the administered pure oxygen in the lung before the administration of carbon monoxide. Hence, it can be achieved that as much oxygen as possible is present in the body of the patient, which facilitates the in- and exhalation of the patient during the subsequent administration of carbon monoxide. Also, the degree of hypoxia is reduced that can be induced by the administration of carbon monoxide. Thus, the carbon monoxide can be administered to a wider range of patients.

In a preferred embodiment, the in- and exhaling of the oxygen in the method occurs before the step i) for a first duration and the in- and exhaling of the gas in step ii) occurs for a second duration, wherein the first duration is 0.1-6 minutes, preferably 1-4 minutes, and wherein the second time is 1-240 minutes, preferably 2-10 minutes, particularly preferred 6-10 minutes. The measurement times can be suitably adjusted dependent on the desired measurement method or dependent on the patient. Preferably, the first time can be sufficient to accordingly prepare the patient or the hemoglobin in the blood of the patient such that the hemoglobin, as described above, is present in a suitably defined manner, and further the second time can be sufficient such that almost the entire administered carbon monoxide has been uptaken by the patient through in- and exhalation.

4. DESCRIPTION OF THE FIGURE

For a better understanding of the present invention and to clarify the practical applicability a FIGURE is provided in the following and reference is made to it. It should be understood that the FIGURE represents only one example embodiment and thus it does not delimit in any manner the scope of the claimed invention.

FIG. 1 shows the schematic layout of the device for the determination of the hemoglobin amount.

5. DETAILED DESCRIPTION OF THE PREFERRED EMBODIMENT

In the following, the present invention is described in more detail with reference to the accompanied FIGURE which illustrates an example embodiment of the present invention. It is, however, also possible that the present invention is provided in a different manner, such that the following described embodiment is to be regarded not as limiting for the scope of the invention. The described embodiment should rather illustrate the scope of the invention to a person skilled in the art.

FIG. 1 shows a schematic layout of the device for the determination of the hemoglobin amount of a patient. Herein, a CO source 1 is connected to a CO safety valve 5 via a first pressure reducer 3. The CO source 1 can be, for example, a CO gas bottle at which a large amount of CO gas is compressed with a high pressure. The connection can be for instance employed with a gas tight elastic tube, which allows that the CO source 1 can also be arranged far remote from the other parts of the device. Thus, the CO source 1 can be for instance stored in a suitable storage room, whereas the other parts of the device can be arranged in a common treatment room. The CO safety valve 5 is in turn connected to a second CO pressure reducer 7. Further, the second CO pressure reducer 7 is connected to the CO reservoir 15 via a first throttle 9 and a valve 13. The pressure is detected by a pressure sensor 11 between the first throttle 9 and the valve 13. Due to the upstream valves and throttles it can be prevented that CO gas is supplied to the subsequent system with an excessive pressure. Accordingly, damages because of an excessive pressure can be prevented at the subsequent parts of the system. Also, an undesired leakage of the toxic CO gas can be prevented.

The pressure sensor 11 ensures that the CO reservoir 15 can be filled with a suitable pressure. Temperature and pressure of the CO in the CO reservoir 15 are detected by respective sensors 17, 19. If the volume of the CO reservoir 15 is known, the exact amount of supplied CO can be accordingly determined. The CO reservoir 15 is in turn connected with a second throttle 21. A CO reservoir 15 can be rinsed with CO by guiding the CO to an outlet 27 via a valve 25. Thus, the CO reservoir 15 can be brought into a defined initial state before each operation. The second throttle 21 is further connected to the closed gas volume 100 via a valve 23. Thus, a defined amount of CO can be guided into the closed gas volume 100 from the CO reservoir 15. Further, an $O_2$ source 29 is connected to a second $O_2$ pressure reducer 33 via a first $O_2$ pressure reducer 31. The $O_2$ source 29 can be for instance an $O_2$ gas bottle at which a large amount of gas is compressed with a high pressure. As for the CO source 1 also the $O_2$ source 29 can be connected via a gas tight tube which provides for a flexible layout of the $O_2$ source 29. The pressure reducers 31, 33 prevent that $O_2$ gas is supplied into the closed gas volume with excessive pressure. While the patient breathes pure $O_2$ gas in the first time period (also denoted as "rinsing" with $O_2$) the valve 35 connected with the second pressure reducer 33 is open and $O_2$ is supplied to the closed gas volume 100. Subsequently, CO can be supplied to the closed gas volume and the valve 35 can be opened for a short time to rinse the CO which potentially remained in the supplying connections into the closed gas volume by the inflowing $O_2$. While the patient breathes the CO enriched gas during a particular second time period, valve 35 is closed and O₂ is supplied to the closed gas volume 100 via valve 37 until a desired oxygen concentration in the gas of the closed gas volume 100 is provided. The temperature of the gas in the closed gas volume 100 is detected by a temperature sensor 39. A patient in- and exhales the gas in the closed gas volume 100 with the mouth piece 47 in the direction of the arrows in the closed gas volume 100. The exhaled gas is filtered via a CO₂ filter 51 which is arranged in the closed gas volume. Thus, an accumulation of CO₂ gas in the closed gas volume 100 is prevented. During in- and exhalation, after supply of the CO, a first valve 43 is opened which allows for in- and exhaling into a connected elastic balloon 41. A second vale 45 of the closed gas volume 100, which connects the closed gas volume 100 with an outlet 49, is meanwhile closed. The elastic balloon 41 extends during an exhalation of the patient and contracts during an inhalation of the patient. Via the distance 57 to the envelope of the elastic balloon 41, which is determined by an optical distance detector 55, it can be determined how much gas volume remains in the elastic balloon 41. By the difference of the volumes of in- and exhalation the lung volume of the patient can also be determined. Further, the breathing frequency of the patient can be determined by the temporal volume change of the elastic balloon 41. After the patient has in- and exhaled the CO enriched gas of the closed gas volume too for a particular time, the first valve 43 of the closed gas volume too is closed and the second valve 45 is opened. Hence, the gas from the closed gas system 100 is exhaled from the patient via the outlet 49.

Upstream of the second valve 45, a CO detector 53 is arranged, which can detect the CO amount of the exhaled gas. By the detection of the CO of the exhaled gas it can be determined how much CO was not taken up by the patient. This value can be used for the correction of the value of the CO amount administered to the patient. The parts of the device can be arranged in a housing 59 and the CO and O₂ sources and the first pressure reducers 3, 31 can be stored outside the housing 59 and can be connected via corresponding ports with the parts inside the housing 59. This allows for a separate storage and hence for an easy exchange of the CO or O₂ sources. The exhaust gases which are not needed can be guided out of the housing 59 via corresponding outlets 27, 49. Further, the balloon 41 is arranged in the housing 59 such that its distance to an optical distance detector 55, which is fixedly arranged at the housing 59, can be detected which allows for a determination of the filling volume of the elastic balloon 41. For the determination of the hemoglobin amount, a blood sample is taken from the patient before administering the CO and the concentration of the CO bound to the hemoglobin is determined. After the CO was administered to the patient and he breathed the CO enriched gas for a certain time, a blood sample is again taken from him and the concentration of the CO that is bound to the hemoglobin is determined. The concentration of CO that is bound to the hemoglobin can also be determined non-invasively for instance via optical methods. From both detections of the CO that is bound to the hemoglobin the hemoglobin amount in the blood of the patient can be subsequently determined.

LIST OF REFERENCE SIGNS

Reference Sign Part

1 CO source
3 CO pressure reducer 1
5 CO safety valve
7 CO pressure reducer 2
9 Throttle 1
11 Pressure sensor before reservoir
13 Valve before reservoir
15 CO reservoir
17 CO reservoir pressure sensor
19 CO reservoir temperature sensor
21 Throttle 2
23 Valve for CO dosage
25 Valve for CO rinsing
27 Outlet for rinsing the reservoir with CO
29 O₂ source
31 O₂ pressure reducer 1
33 O₂ pressure reducer 2
35 Valve for O₂ rinsing
37 Valve for O₂ dosage
39 Temperature sensor of the gas volume
41 Elastic balloon
43 Valve 1 gas volume
45 Valve 2 gas volume
47 Mouth piece
49 Outlet of the gas volume
51 CO₂ filter
53 CO detector
55 Optical distance detector
57 Distance to balloon
59 Housing
100 Closed gas volume

The invention claimed is:

1. A method for the determination of a hemoglobin amount of a patient using a carbon monoxide administration device, the carbon monoxide administration device having a closed gas volume, a gas outlet including a mouthpiece configured to enable inhalation and exhalation of gas into and out of the closed gas volume, and a carbon monoxide reservoir that provides a carbon monoxide supply into the closed gas volume, the carbon monoxide reservoir having a volume which is provided with sensors for the determination of temperature and pressure of the carbon monoxide in the carbon monoxide reservoir, wherein the method comprises the steps of:
   i) supplying a defined amount of carbon monoxide to the closed gas volume;
   ii) in and exhaling the gas in the closed gas volume by the patient;
   iii) non-invasively determining the amount of carbon monoxide in the blood of the patient;
   iv) determining the hemoglobin value based on the amount of carbon monoxide in the blood of the patient, wherein the method comprises before step i) the steps:
   supplying pure oxygen into the closed gas volume; and
   in- and exhaling of the supplied pure oxygen by the patient.

2. The method according to claim 1, comprising a step of filtering out carbon dioxide from the closed gas volume with a carbon dioxide filter arranged in the closed gas volume.

3. The method according to claim 1, comprising a step of supplying oxygen to the closed gas volume from an oxygen supply.

4. The method according to claim 3, wherein the oxygen supply includes an elastic balloon, and the method includes a step of detecting a distance between an optical means and an envelope of the elastic balloon to determine a filling volume of the elastic balloon.

5. The method according to claim 1, comprising a step of detecting the carbon monoxide content of the closed gas volume.

6. The method according to claim 1, comprising a step of determining a volume of the carbon monoxide in the carbon monoxide reservoir with a measurement inaccuracy of <10 ml.

7. The method according to claim 1, wherein the in- and exhaling of the oxygen before the step i) occurs for a first duration and the in- and exhaling of the gas in step ii) occurs for a second duration, wherein the first duration is 0.1-6 minutes.

8. The method according to claim 1, wherein the step of supplying a defined amount of carbon monoxide includes measuring the temperature and the pressure of carbon monoxide in the carbon monoxide reservoir.

\* \* \* \* \*